(No Model.)
F. BAIN.
CONTROLLING VALVES BY ELECTRICITY.
No. 356,024. Patented Jan. 11, 1887.
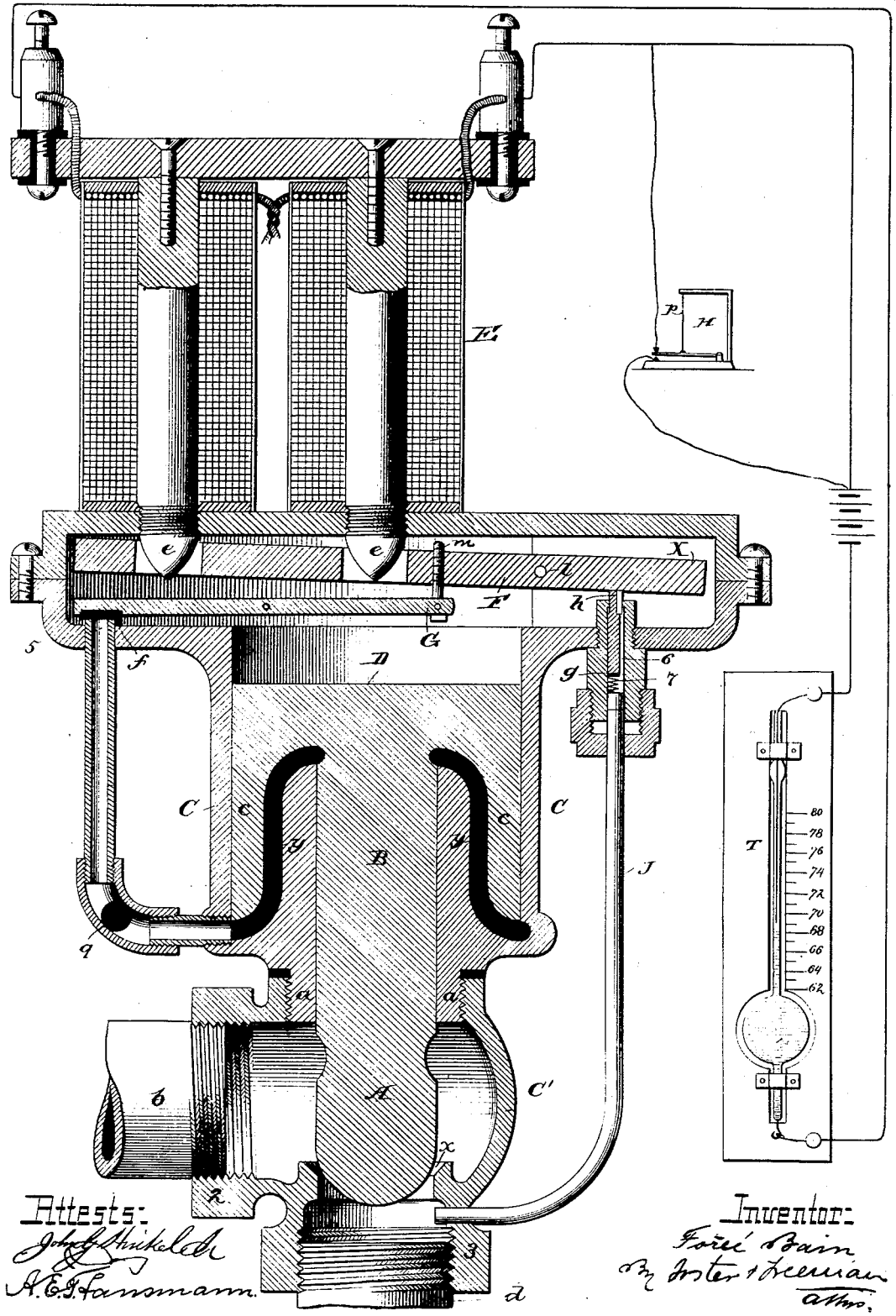

UNITED STATES PATENT OFFICE.

FORÉE BAIN, OF CHICAGO, ILLINOIS.

CONTROLLING VALVES BY ELECTRICITY.

SPECIFICATION forming part of Letters Patent No. 356,024, dated January 11, 1887.

Application filed February 27, 1886. Serial No. 193,497. (No model.)

*To all whom it may concern:*

Be it known that I, FORÉE BAIN, a citizen of the United States, and a resident of Chicago, in the county of Cook and State of Illinois, have invented certain new and useful Improvements in Controlling Valves by Electricity, of which the following is a specification.

My invention has for its object to readily operate, either automatically or by hand, valves controlling the flow of steam, water, and other fluids in heaters, and apparatus of various kinds, and this object I effect by means of an engine for moving such valve, and by an electro-magnet controlling the flow of motor-fluid to and from said engine, so that the said valve may be operated with wire connections only from distant points and by the use of only such little power as is requisite to make and break electrical circuits.

The drawing is a sectional elevation showing a steam-valve and my improved valve-operating appliances.

My improved valve-operating device consists of a valve, an engine whereby said valve is opened and closed, and an electromotor controlling the flow of motor-fluid to and from the engine, so as to put the same into and out of operation, and thereby open and close the valve. These features may be embodied in different forms and arrangements, some of which I will now describe.

In the drawing, the valve A is the rounded end of a plunger, B, sliding in an opening in a casing, C, which opening extends through a hollow branch, *a*, screwing into one of the three branches of a valve-casing, C'. With another branch, 2, of the casing C' communicates the outlet steam-pipe *b*, (or it may be drip or waste pipe,) and with the other branch, 3, communicates the outlet steam-pipe *d*, which branch is formed within into a seat, *x*, for the valve A, the lifting of which puts the pipes *b d* into communication, while the descent of the valve onto its seat cuts off such communication.

The valve-operating engine, as shown, consists of a piston, D, at the upper end of the plunger B, said piston fitting the internal bore of the casing C, which constitutes a cylinder, to and from which the motor-fluid is passed to raise and lower the piston and with it the valve.

The piston D may be a flat disk, but, as shown, it has a dependent peripheral flange, *c*, which steadies the piston on its sliding movements, and serves to prevent steam leaking from the upper side to the under side of the piston. The long bearing of the plunger B also prevents the steam from passing from the interior of the casing C' to the under side of the piston.

The casing C is enlarged at the top to form a chamber, X, into which project the poles *e e* of an electro-magnet, E, and containing an armature, F, pivoted at *i*, so that one end may rise to and fall from the poles, the armature being recessed or perforated opposite the poles to prevent direct contact therewith and adhesion from residual magnetism.

The chamber X has an outlet-port, 5, closed by a valve, *f*, and an inlet-port, 6, closed by a valve, *g*, which closes to its seat by an upward motion, a light spring, 7, tending to hold the valve closed, but yielding readily to downward pressure.

The movements of the armature are made the means of opening and closing these valves in any suitable manner. Thus the valve 6 has a projecting stem, *h*, which may be struck by the descending end of the armature to open the valve, and the valve *f* is secured to a lever, G, pivoted below the armature and connected thereto by a set-screw connection, *m*, so that when one end of the armature rises to close the port 6 the valve *f* will be simultaneously raised and the port 5 opened. The port 6 is in communication, through a pipe, J, with the steam-supply pipe *d*, so that when the valve *g* is depressed and the port 6 opened steam will enter the chamber X and will act on the piston D and depress the same, closing the valve A, the area of which is so much less than that of the piston D that the greater pressure on the top of the piston will insure its descent, and will keep it in place, the valve *f* closing the port 5 and preventing the escape of steam from the chamber X.

When the valve A is to be opened, the armature is moved to close the valve *g* and open the valve *f*, when the steam will escape from the chamber X, reducing the pressure on the top of the piston D to that of the atmosphere, when the superior pressure on the end of the plunger will lift the latter and permit the steam to pass to the casing C' and to the pipe b.

The shifting of the armature is effected by throwing an electric current into or cutting it off from the magnet E, which, when excited, lifts the armature and drops it when the current is cut off; or the armature may be moved positively in both directions by changing the polarity of the current by any well-known appliances, thus avoiding the necessity of maintaining a completed circuit in order to hold the armature in its elevated position.

The opening and closing of the circuit may be effected by means of a hand-switch, or automatically by changes in temperature, degrees of moisture in the atmosphere, or by barometric changes, through the medium of thermostats, barometers, and other like devices which I include under the term "regulators." Thus a thermostat, T, is arranged in the electric circuit to complete the circuit when the mercury rises to make contact with the terminal of the conductor; or a hydrometric switch, H, which is shifted to make and break the circuit by the twisting of a piece of catgut, p, may be arranged in the circuit.

The chamber y beneath the piston D, and the port 5 both communicate with a pipe, q, which carries off the escape-steam from the chamber X, and the drip from both chambers, and affords an outlet that prevents the accumulation of any steam under pressure under the piston D.

It will be evident that different forms of valve devices may be used for controlling the flow of motor-fluid to and from the valve-operating engine.

Without limiting myself to the precise construction and arrangement of parts shown and described, I claim—

1. The combination of a casing, valve connected to and forming part of a stem or plunger extending through said casing, a piston in the valve-plunger greater in area than the valve, a cylinder containing said piston, ports for permitting the motor-fluid to flow to and from the cylinder, a valve device controlling said ports, and an electro-magnet having its armature connected to operate said valve device, substantially as described.

2. The casing C' C, valve-seat x, valve A, plunger B, piston D, channel connecting the casing below the valve-seat and the chamber above the piston, armature in said chamber, valve device connected to the armature, and electro-magnet controlling said armature, substantially as described.

3. In an apparatus for electrically controlling the flow of fluids, the combination, with the valve and piston, a pipe and valve therein, and a vent-pipe, of the pivoted armature controlling said vent and valve, and an electro-magnet controlling said armature-lever, substantially as described.

4. The combination of the valve, plunger, and piston, all formed of one piece, a casing containing the piston and enlarged above the latter, ports for permitting the flow of the motor-fluid to and from the cylinder, a pivoted armature controlled by a magnet to operate one of the ports, and a lever controlled by the armature to close the other port, substantially as described.

5. The combination of the casing, the valve-seat, the valve, the plunger, piston, channel connecting the casing below the valve-seat and the chamber above the piston-outlet to said chamber, armature in said chamber, lever connected thereto, and electro-magnet controlling said armature, substantially as described.

6. In means for electrically controlling the flow of fluids, the combination, with the valve-casing having inlet and outlet pipes, and a valve therein, of a chamber in the casing, an armature within the chamber, a lever connected to the armature, and a magnet controlling said armature, the said armature and lever operating to open and close the inlet and outlet pipes, substantially as described.

In testimony whereof I have signed my name to this specification in the presence of two subscribing witnesses.

FORÉE BAIN.

Witnesses:
W. H. DYRENFORTH,
GEORGE C. COOK.